Sept. 6, 1966    A. M. BIGGAR ETAL    3,271,641
VARIABLE CAPACITOR
Filed April 1, 1965
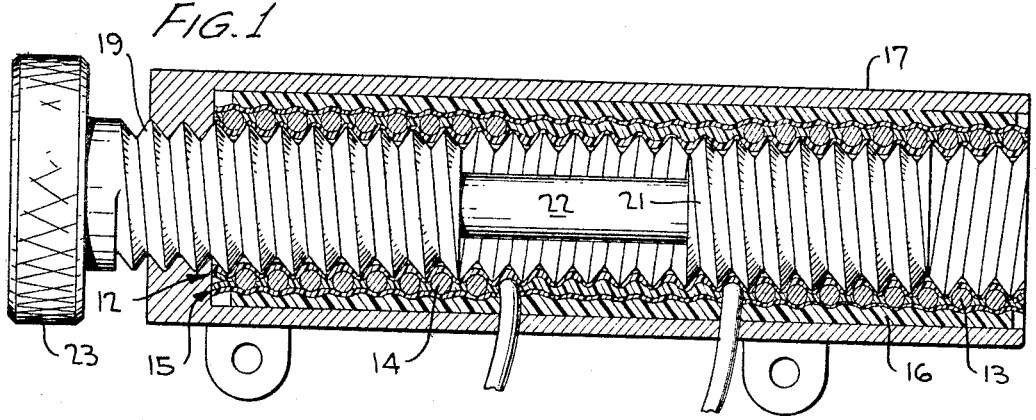
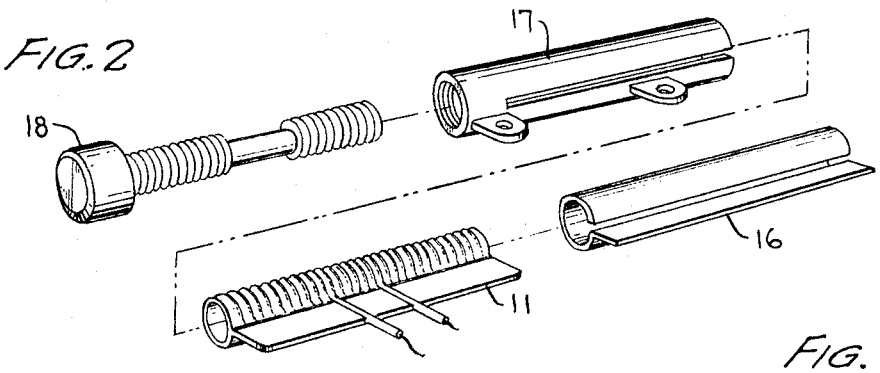
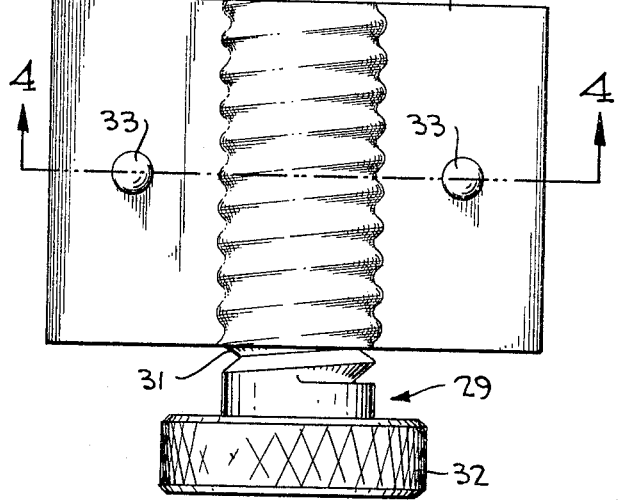
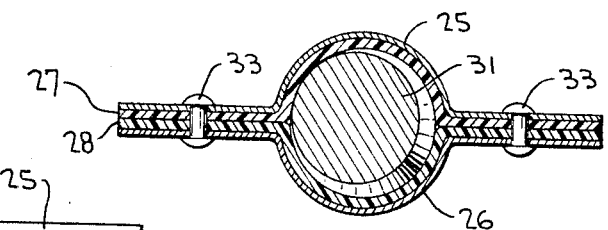
INVENTORS
ALLAN M. BIGGAR
MAURICE APSTEIN
BY Harry M. Saragovitz,
Edward J. Kelly, Herbert Berl
& Charles J. Whitham ATTORNEYS

3,271,641
VARIABLE CAPACITOR
Allan M. Biggar, Arlington, Va., and Maurice Apstein, Bethesda, Md., assignors to the United States of America as represented by the Secretary of the Army
Filed Apr. 1, 1965, Ser. No. 444,877
8 Claims. (Cl. 317—249)

The invention described herein may be manufactured and used by or for the Government of the United States of America for governmental purposes without the payment to us of any royalty thereon.

This invention relates to capacitors, and more particularly to subminiature variable capacitors having wide application in a variety of microelectronic circuits.

In the last several years, the trend in military electronics has been toward highly compact, rugged and reliable circuits which are inexpensive to produce. An example of such circuits is a miniature superheterodyne short-wave receiver having a volume of about one third of a cubic inch which was recently developed by the Harry Diamond Laboratories in Washington, D.C. This receiver has a tuning range of nine to twenty megacycles and requires a two-section variable capacitor. While many good capacitors of small size exist, none offer the combination of large capacitance change, high Q, fine-adjustment capability, shielding, and suitability for ganging as is required in communications receiver of this type. To be usable in the receiver, it was also required that the capacitor be mechanically rugged, free from blacklash and other instabilities, capable of fine adjustment comparable to that provided by a precision gear train, and relatively simple to produce.

It is therefore an object of this invention to provide a subminiature variable capacitor which provides a large capacitance change and a high Q.

It is another object of the invention to provide a rugged, inexpensive variable capacitor for use in microelectronic circuits which is capable of fine adjustment and is free from backlash.

It is a further object of the instant invention to provide a shielded variable capacitor having a high capacitance and which occupies a small volume.

According to the present invention, the foregoing and other objects are attained by providing a movable electrode in the form of a continuous screw in which the screw surfaces are free of any burrs or cutting edges, a film of insulating material which approximately conforms to the external surface of the screw, maintaining close contact with the surface of the screw, but not preventing motion thereof, and a fixed electrode consisting of an electrically conductive material which approximately conforms with the external surface of the screw and is in close contact with the exterior surface of the film of insulating material, the film serving to separate the fixed electrode from the movable electrode.

The specific nature of the invention, as well as other objects, aspects, uses and advantages thereof, will clearly appear from the following description and from the accompanying drawing, in which:

FIGURE 1 is a view partially in cross-section showing the construction of one embodiment of the invention;

FIGURE 2 is an exploded view of the embodiment shown in FIGURE 1;

FIGURE 3 is a plan view of another embodiment of the invention; and

FIGURE 4 is a cross-sectional view taken along the section lines 4—4 in FIGURE 3 and serves to illustrate the construction of the embodiment shown in FIGURE 3.

Referring now to the drawings, and more particularly to FIGURES 1 and 2, there is illustrated the construction of a miniature variable capacitor having two ganged sections. The capacitor comprises a dual-section fixed electrode structure 11 composed of laminated plastic films and copper-wire windings. In the particular example of the capacitor used in the aforementioned receiver developed at the Harry Diamond Laboratories, the fixed electrode structure 11 is made in the following manner: From a 1.5 mil-thick polyethylene-coated polyester film, a piece about 1 by 1.5 inches is cut out. For purposes of identification, a colored line may be run down one of the long edges of the piece. A quarter-section of the piece is then cut away to leave an L-shaped piece with the colored line across the end of the short leg. The piece is then wrapped, polyethylene side out, around a 2–56 threaded mandrel to give a 1.5 inch-long wrapping which is thicker at the end bearing the colored line than at the other end. A 36-gage bare copper wire is then wound over the plastic wrapping and down into the threads of the mandrel. The wrapped mandrel is next heated to about 150° C. thereby fusing the polyethylene coating around the copper wire and locking the wire in place. After cooling the assembly, the wire near the center of the mandrel is cut and unwound a short distance in each direction. Thus, two separated windings of copper wire are produced to provide tuning for the radio frequency amplifier and local oscillator circuits in the receiver. A second piece of the same film is then wrapped around the assembly, polyester side out. The assembly is then clamped between two 0.25 inch-thick sheets of soft silicone rubber, and, while still clamped, the plastic film layers are fused together at about 150° C. The resulting fixed electrode structure 11, as may be clearly seen from an inspection of FIGURE 1, thus is composed of a first thin film of plastic 12 formed into a tubular shape, two copper windings 13 and 14 separated by a distance and fused into the exterior surface of the tubular film of plastic 12, and a second thin film of plastic 15 laminated over the copper winding 13 and 14 and the tubular film of plastic film 12.

Continuing, with reference to the specific capacitor used in the receiver, the fixed electrode structure 11 is encased in a molded polyethylene jacket 16. The whole assembly, fixed electrode structure 11 and jacket 16, is inserted into a 0.25 inch-diameter thin-walled slotted metal sleeve 17, which serves both as a shield-can and as a contact-to-ground for the moveable electrode.

The moveable electrode 18 comprises two separate sections 19 and 21 of a 2–56 brass screw mounted axially on a single piano-wire shaft 22. The sections 19 and 21 ordinarily rotate as a single assembly, but one section can be rotated independently, with difficulty, by virtue of its friction fit to the shaft to permit some adjustment in relative capacitances thereby simplifying the initial alignment of the receiver. Finally, the moveable electrode 18 also includes a tuning head 23 fixedly attached to brass screw section 19. As illustrated, the tuning head 23 is knurled in order to facilitate gripping with the fingers to tune the capacitor. Obviously, a slot in the body of section 19, or an extension thereof, which would permit tuning by a screwdriver would serve the same purpose as tuning head 23.

In a typical capacitor constructed as described above, the capacitance of one section is variable between 0.75 and 8.0 picofarads and of the other section between 1.5 and 12.0 picofarads, the Q ranges from 224 at 10 megacycles to 190 at 20 megacycles. The range of each capacitor section depends, of course, on the thickness of its insulation and its length. The exact dimensions of the L-shaped insulator were set to provide the desired maximum capacitance in each section. The minimum capacitance is determined mainly by the distance between the fixed electrode structure 11 and the shield-can 17.

It should be appreciated that the foregoing description relates only to the specific construction of one embodiment and that many modifications can be made to the embodiment. For example, a larger number of sections could be ganged if desired, or only one section may be made. The insulating films 12 and 15 may be dielectric materials other than polyethylene-coated polyester film. More specifically, polyethylene-coated films of polyfluorocarbons or polypropylene may be used and have the effect of increasing the Q of the capacitor. Also, the dielectric film could be of varied shapes before winding, if desired, to obtain various forms of nonlinearity. It is additionally possible to arrange sections so that the capacitance of one section does not begin to change until the next has reached some predetermined level, or so that one section increases as another decreases.

Another embodiment of the invention is illustrated in FIGURES 3 and 4 of the drawings as a single section variable capacitor. In this embodiment, the fixed electrode is composed of two thin metal electrodes 25 and 26 bonded to two thin films of dielectric material 27 and 28, respectively. The electrodes 25 and 26 may be bonded to the dielectric films 27 and 28 by cementing, vacuum deposition, or any other suitable means. The moveable electrode 29 comprises a screw 31 and a tuning head 32 substantially as in the embodiment shown in FIGURES 1 and 2. The fixed electrodes and dielectric films which carry them are pressed or otherwise formed in such manner that a portion of the films and the electrode metal assume a shape approximately conforming to the surface of screw 31. Each metal electrode thus formed provides half the total fixed electrode of the capacitor. The two parts of the fixed electrode may be fastened together by rivets 33 or other suitable means. If desired, the electrodes 25 and 26 may be used as the fixed elements of two separate capacitors having a common moveable electrode 29 or the screw 31 may be used to vary the capacitance between the electrodes 25 and 26, in either of which cases the rivets 33 should be made of a non-conductive material.

Many other embodiments of this invention are possible. Generally, the practice of the invention requires a dielectric film which conforms to the general contour of the screw thread of the moveable electrode, the film being interposed between the screw and a fixed metallic electrode having a threaded cavity therein. While the fixed electrode has been specifically illustrated as a wire winding and as a thin metal electrode, the fixed electrode can also take the form of a two-piece metallic block having a threaded bore therethrough. Other suitable arrangements will be apparent to those skilled in the art. It is only necessary that the surface of the fixed electrode adjacent to the screw substantially conform to the threads of the screw. Obviously, it is a general requirement in all embodiments that the threads of the screw be sufficiently rounded and free from burrs to prevent cutting of the insulation film.

It will be apparent that the embodiment shown is only exemplary and that various modifications can be made in construction and arrangement within the scope of the invention as defined in the appended claims.

We claim as our invention:
1. A subminiature variable capacitor comprising:
 (a) a movable electrode in the form of a continuous screw,
 (b) a first thin film of insulating material approximately conforming to the threaded surface of said electrode,
 (c) a second thin film of insulating material approximately conforming to said threaded surface and being in superposition with respect to said first film,
 (d) a fixed electrode approximately conforming to said threaded surface and being locked in place between said first and second films,
 (e) said first film maintaining close contact with said threaded surface but permitting movement thereof,
 (f) said first film serving as the dielectric between said fixed electrode and said movable electrode, and
 (g) a tubular metallic shield can surrounding said second film.

2. The capacitor according to claim 1 wherein said fixed electrode comprises a wire wound in the threads of said movable electrode.

3. The capacitor according to claim 2 wherein:
 (a) each of said films comprises a plastic-coated plastic film,
 (b) said wire being fused into the adjacent plastic coatings of said superposed films,
 (c) whereby said plastic films and said wire windings form a unitary laminated structure.

4. The variable capacitor according to claim 3 further comprising a jacket of insulating material interposed between said shield can and said second film and encasing said second film.

5. The capacitor according to claim 3 wherein:
 (a) each of said films consists of a polyethylene-coated polyester film,
 (b) said wire being fused into the polyethylene layers of said superposed films.

6. The capacitor according to claim 3 wherein:
 (a) each of said films consists of a polyethylene-coated polyfluorocarbon film,
 (b) said wire being fused into the polyethylene layers of said superposed films.

7. The capacitor according to claim 3 wherein:
 (a) each of said films consists of a polyethylene-coated polypropylene film,
 (b) said wire being fused into the polyethylene layers of said superposed films.

8. A subminiature variable capacitor comprising:
 (a) a movable electrode in the form of a continuous screw,
 (b) a metalized plastic film approximately conforming to the threaded surface of said electrode,
 (c) the plastic side of said film maintaining close contact with said threaded surface but permitting movement thereof,
 (d) the thin metal layer of said film comprising the fixed electrode of said capacitor, and
 (e) said plastic film serving as the dielectric separating said fixed electrode from said movable electrode.

References Cited by the Examiner
UNITED STATES PATENTS

| | | | |
|---|---|---|---|
| 2,567,280 | 9/1951 | Foster et al. | 317—249 |
| 2,780,784 | 2/1959 | Hill et al. | 317—249 |

FOREIGN PATENTS

| | | |
|---|---|---|
| 175,643 | 7/1953 | Austria. |
| 496,315 | 11/1938 | Great Britain. |

References Cited by the Applicant
UNITED STATES PATENTS

| | | |
|---|---|---|
| 2,477,688 | 8/1949 | Dyer. |
| 2,503,084 | 4/1950 | White et al. |
| 2,504,758 | 4/1950 | Thias et al. |
| 2,516,981 | 8/1950 | Hall et al. |
| 2,595,194 | 4/1952 | Heibel. |
| 2,748,327 | 5/1956 | Wadsworth. |
| 2,904,845 | 9/1959 | Sperry. |

LEWIS H. MYERS, *Primary Examiner.*
ROBERT K. SCHAEFER, *Examiner.*
D. J. BADER, *Assistant Examiner.*